(12) United States Patent
Hung

(10) Patent No.: US 7,569,101 B2
(45) Date of Patent: Aug. 4, 2009

(54) ROTOR REPLACING MECHANISM FOR ROTARY DESICCANT

(75) Inventor: Ming-Lang Hung, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 356 days.

(21) Appl. No.: 11/647,450

(22) Filed: Dec. 29, 2006

(65) Prior Publication Data

US 2007/0295215 A1    Dec. 27, 2007

(30) Foreign Application Priority Data

Jun. 23, 2006    (TW) .............................. 95122581 A

(51) Int. Cl.
*B01D 53/06* (2006.01)

(52) U.S. Cl. .............................. 96/125; 96/151; 62/271

(58) Field of Classification Search .................. 96/125, 96/150, 151; 95/113; 55/496, 506; 62/271
See application file for complete search history.

(56) References Cited

U.S. PATENT DOCUMENTS

| | | | | |
|---|---|---|---|---|
| 4,234,038 A | * | 11/1980 | Dravnieks | .................... 96/118 |
| 5,733,451 A | * | 3/1998 | Coellner et al. | ............. 210/496 |
| 6,478,855 B1 | * | 11/2002 | Okano | ......................... 95/113 |
| 6,527,837 B2 | * | 3/2003 | Kurosawa et al. | ............. 96/125 |
| 7,204,869 B2 | * | 4/2007 | Klingenburg et al. | ......... 96/125 |
| 7,217,313 B2 | * | 5/2007 | Motono et al. | ................. 95/113 |

* cited by examiner

*Primary Examiner*—Frank M Lawrence
(74) *Attorney, Agent, or Firm*—Birch, Stewart, Kolasch & Birch, LLP

(57) ABSTRACT

A rotor replacing mechanism for rotary desiccant includes a base plate, on which a plurality of gears are mounted to form multiple support points, to and between which a rotor of the rotary desiccant is held in place. One or two of the plurality of gears may be moved to different positions to allow easy removal of the rotor from the base plate and accordingly the rotary desiccant and be replaced with a new one.

27 Claims, 9 Drawing Sheets

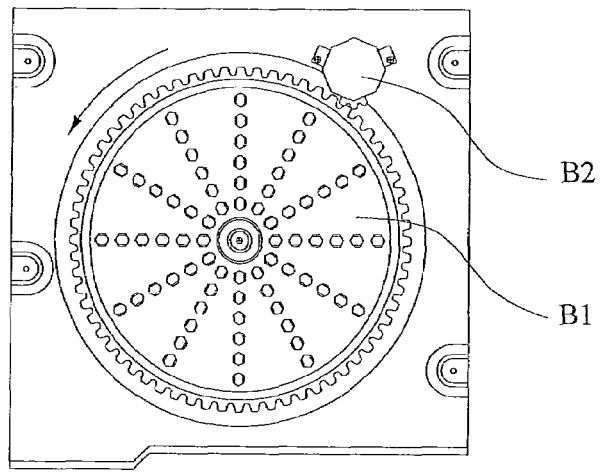
FIG.2
PRIOR ART
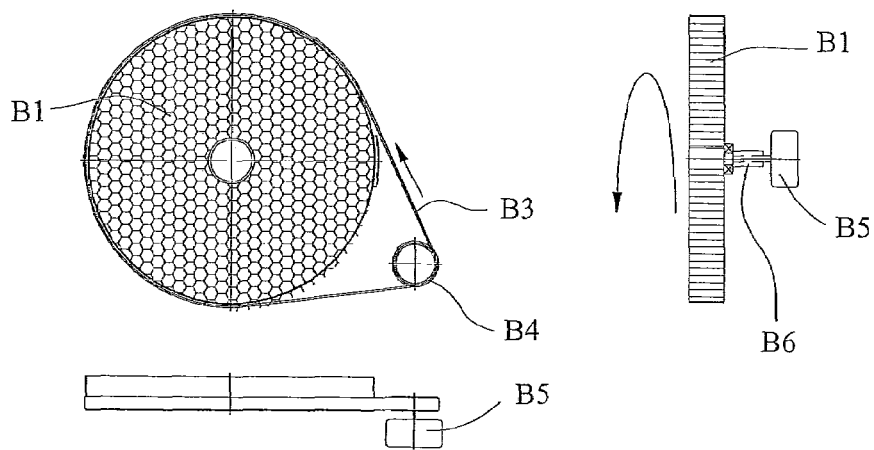
FIG.3
PRIOR ART
FIG.4
PRIOR ART

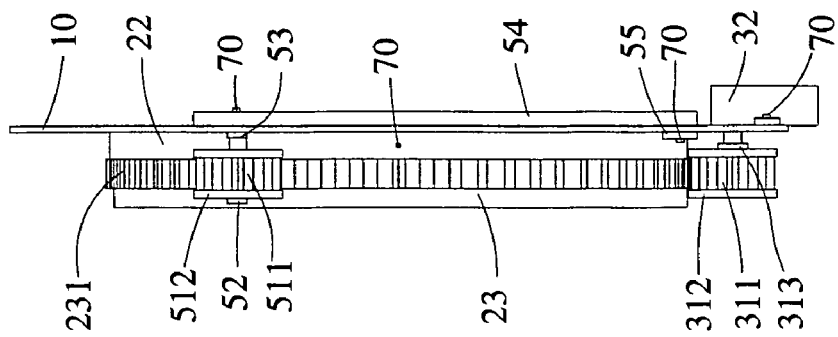
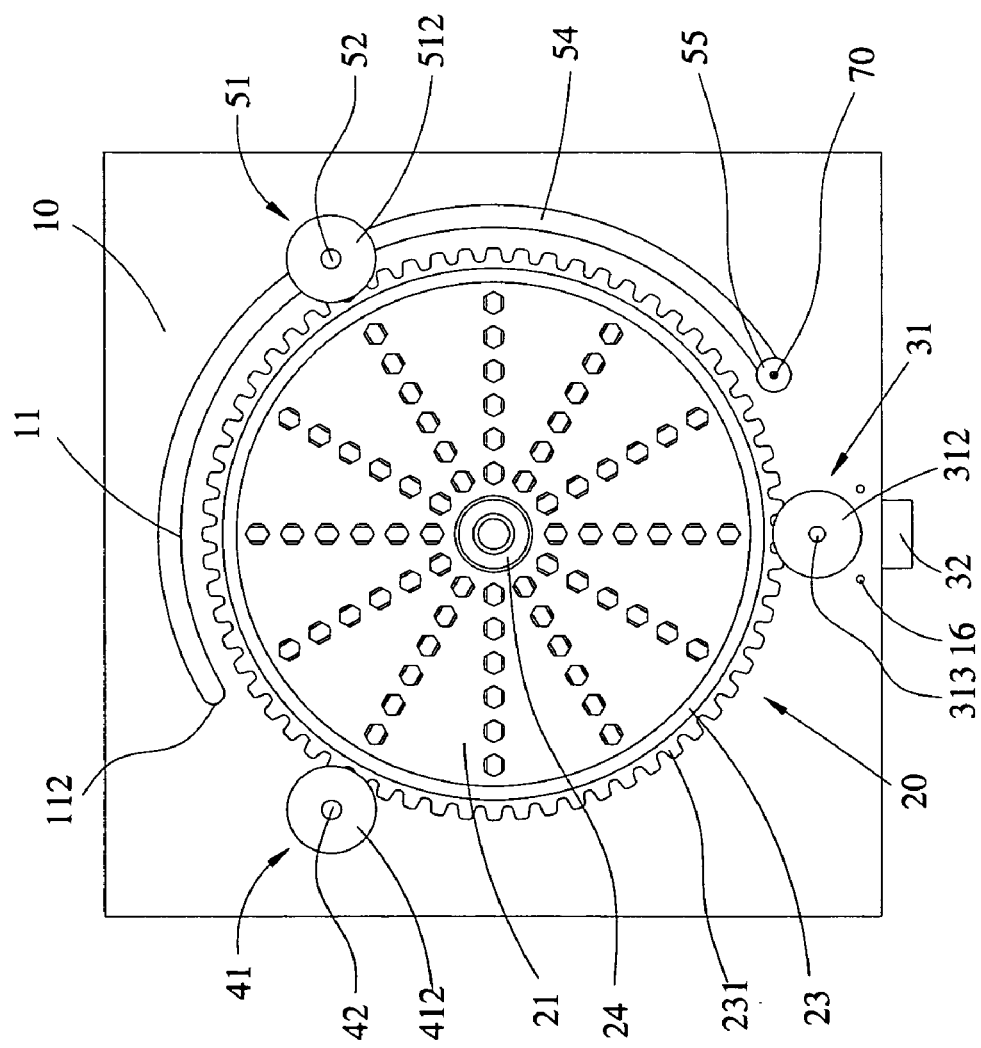
FIG. 7
FIG. 8

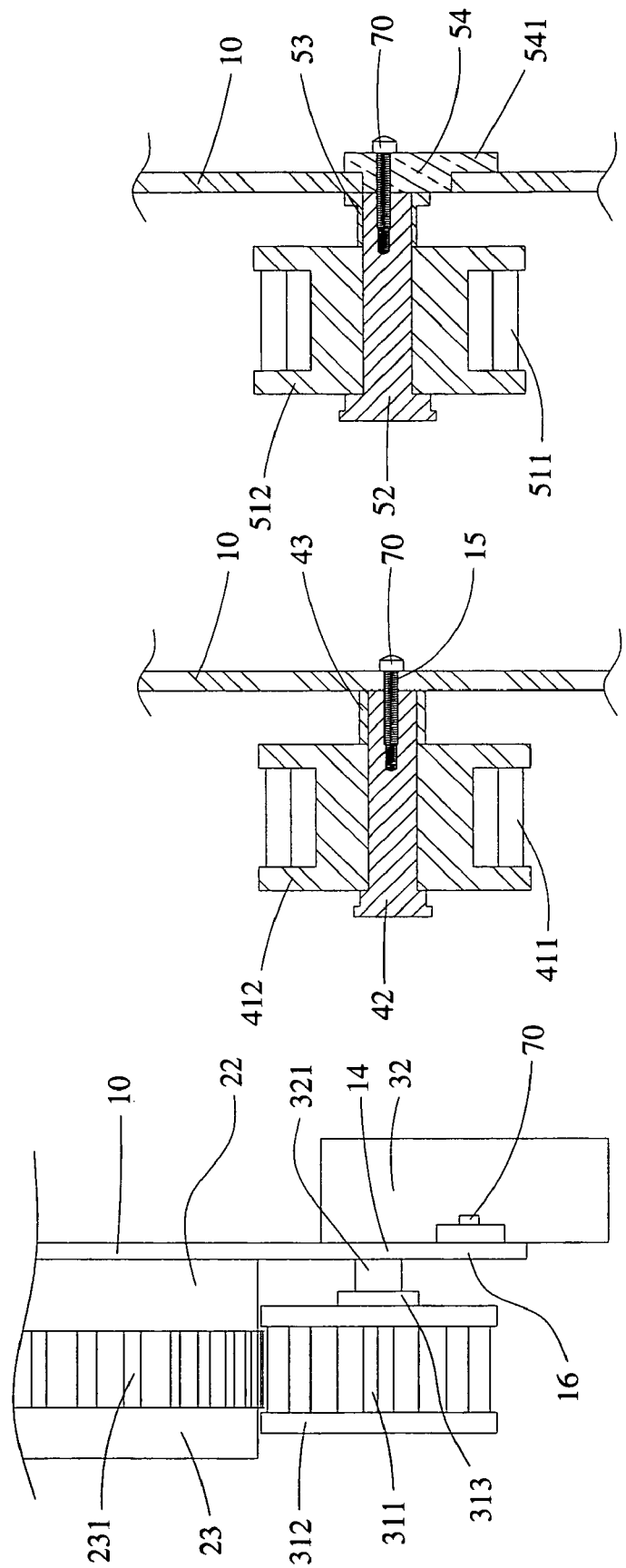

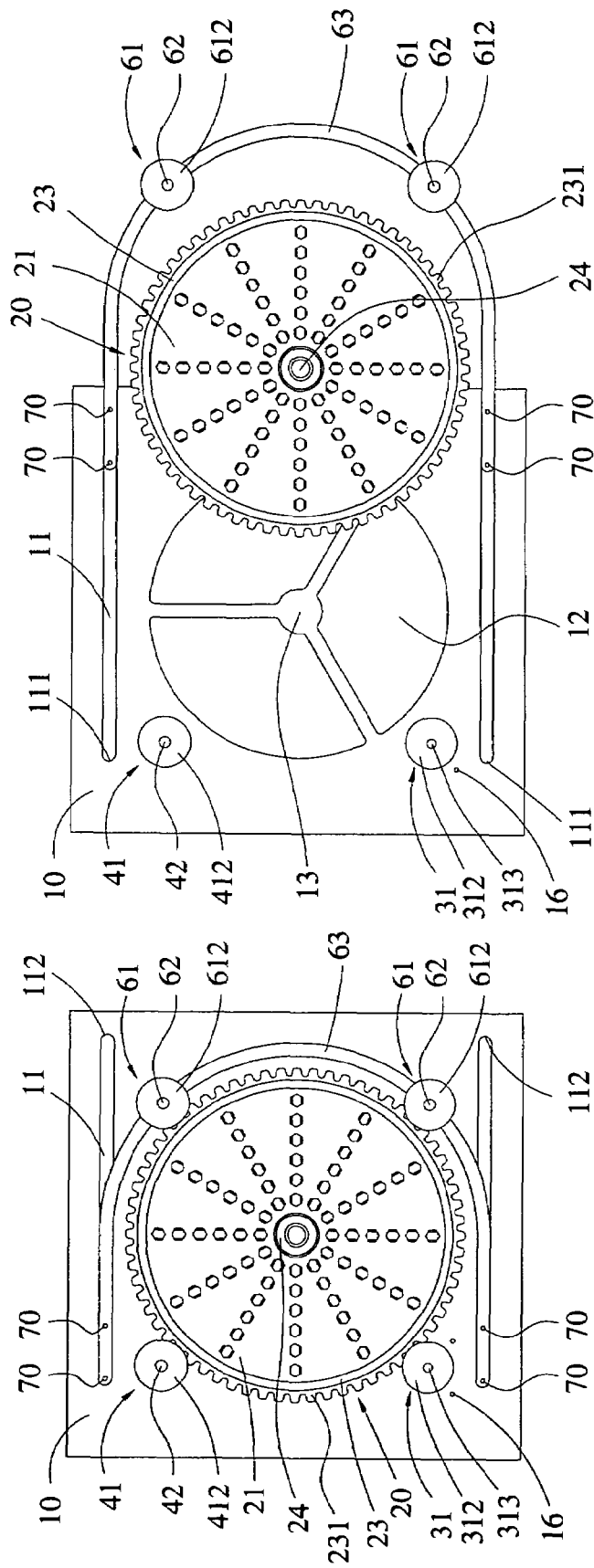

ROTOR REPLACING MECHANISM FOR ROTARY DESICCANT

FIELD OF THE INVENTION

The present invention relates to a desiccant rotor replacing mechanism, and more particularly to a rotor replacing mechanism for rotary desiccant that could rotatably hold a humidifier rotor thereto and allows a general user to easily and independently replace the desiccant rotor.

BACKGROUND OF THE INVENTION

A household condensing desiccant using a desiccant rotor as a dehumidifying element thereof has gradually replaced the conventional compressor-type desiccant in recent years. FIG. 1 shows the structural principle of a general rotary desiccant using a desiccant rotor as the dehumidifying element. As shown, indoor wet air A1 passes through a condenser A9 into a dehumidifying side A2 of the desiccant rotor A3, at where moistures in the wet air A1 are adsorbed to produce dry air A5, which is drafted by an induced-draft fan A4 to complete the removal of moistures from wet air. The desiccant rotor A3 is rotated by a gearing mechanism, so that an area thereof containing the adsorbed moistures is brought to a regeneration side A7 of the desiccant rotor A3, at where the adsorbed moistures are heated to desorb from the rotor A3. There is a regenerating heater A8 located at a beginning of the above-described dehumidifying loop for heating air entered into a heating pipe thereof, so that high temperature air for regeneration is flown through the desiccant rotor A3 to desorb the moistures from the rotor A3 and produces wet hot air A6. The wet hot air A6 is guided by a pipe into the condenser A9, and moistures contained in the wet hot air A6 are condensed. The condensate is guided by a pipe in the condenser A9 to be gathered and collected in a water container A11 disposed at a bottom of the desiccant. The flowing of air in the regeneration area is driven by a regenerating fan A10. With the above arrangements, air dehumidification is achieved.

Generally, a desiccant rotor B1 in this type of dehumidifying apparatus is mounted to a central shaft of the dehumidifying apparatus, and is rotated by an external transmission mechanism B2 to achieve the dehumidifying and regenerating functions. Normally, the desiccant rotor B1 can be a gear-driven, a pulley-driven, or a shaft-driven rotor. In the case of a gear-driven rotor as shown in FIG. 2, a gear of the transmission mechanism B2 meshes with teeth on a protective frame of the rotor B1 to thereby rotate the desiccant rotor B1. In the case of a pulley-driven rotor as shown in FIG. 3, the desiccant rotor B1 is provided on a protective frame with a plurality of teeth, and the transmission mechanism includes a toothed driving pulley B4. A transmission belt B3 connects the desiccant rotor B1 to the driving pulley B4, so as to rotate the rotor B1. In the case of a shaft-driven rotor as shown in FIG. 4, the desiccant rotor B1 has a shaft coupled to a motor B5 via a coupler B6, so that power is transmitted from the motor B5 to the desiccant rotor B1 to rotate the latter.

The above-structured rotary desiccant generally has a nominal service life from 8 to 10 years. However, the actual service life is frequently largely shortened due to working environmental factors, such as dust, smoke particles from cigarette, for example, that tent to clog moisture adsorption holes on the desiccant rotor. To restore and extend the service life of the rotary desiccant, the old rotor must be replaced with a new one. However, it is very inconvenient to replace the desiccant rotor in the conventional rotary desiccant because the whole desiccant must be disassembled before the rotor can be removed and replaced. Therefore, such replacement can not be easily handled by a general user but must be handled by an original manufacturer or dealer using special tools to increase the consumer's and the seller's cost.

SUMMARY OF THE INVENTION

A primary object of the present invention is to provide a rotor replacing mechanism for rotary desiccant, so that a general user may easily independently replace a rotor of a rotary desiccant to save the repair cost that would otherwise be charged by an original manufacturer or dealer.

To achieve the above and other objects, the rotor replacing mechanism for rotary desiccant according to the present invention includes a base plate, on which a plurality of gears are mounted to form multiple support points, to and between which a rotor of a rotary desiccant is held in place. A user may move one or two of the plurality of gears to different positions to easily remove the rotor from the base plate and accordingly the rotary desiccant and be replaced with a new one to maintain the existing function of the rotary desiccant. One of the multiple gears is a driving gear capable of driving the desiccant rotor to rotate. Therefore, the rotor replacing mechanism of the present invention enables easy mounting, rotating, and replacing of the humidifier rotor without hindering the rotary desiccant from its dehumidifying and regenerating functions.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein FIG. 1 schematically shows the structural principle of a conventional rotary desiccant;

FIG. 2 shows a conventional gear-driven rotary desiccant;

FIG. 3 shows a conventional pulley-driven rotary desiccant;

FIG. 4 shows a conventional shaft-driven rotary desiccant;

FIG. 7 is a front view of FIG. 5;

FIG. 8 is a side view of FIG. 5;

FIG. 9 is a fragmentary side view showing the mounting of a first gear assembly to a base plate included in the rotor replacing mechanism for rotary desiccant of FIG. 5;

FIG. 10 is a fragmentary sectioned side view showing the mounting of a second gear assembly to the base plate of the rotor replacing mechanism for rotary desiccant of FIG. 5;

FIG. 11 is a fragmentary sectioned side view showing the mounting of a third gear assembly to the base plate of the rotor replacing mechanism for rotary desiccant of FIG. 5;

FIG. 14 is a front view of a rotor replacing mechanism for rotary desiccant according to a second embodiment of the present invention before the rotor is removed from the desiccant;

FIG. 15 shows the rotor replacing mechanism of FIG. 14 after the rotor is removed from the desiccant;

DETAILED DESCRIPTION OF THE PREFERRED EMBODIMENTS

Figure 1:
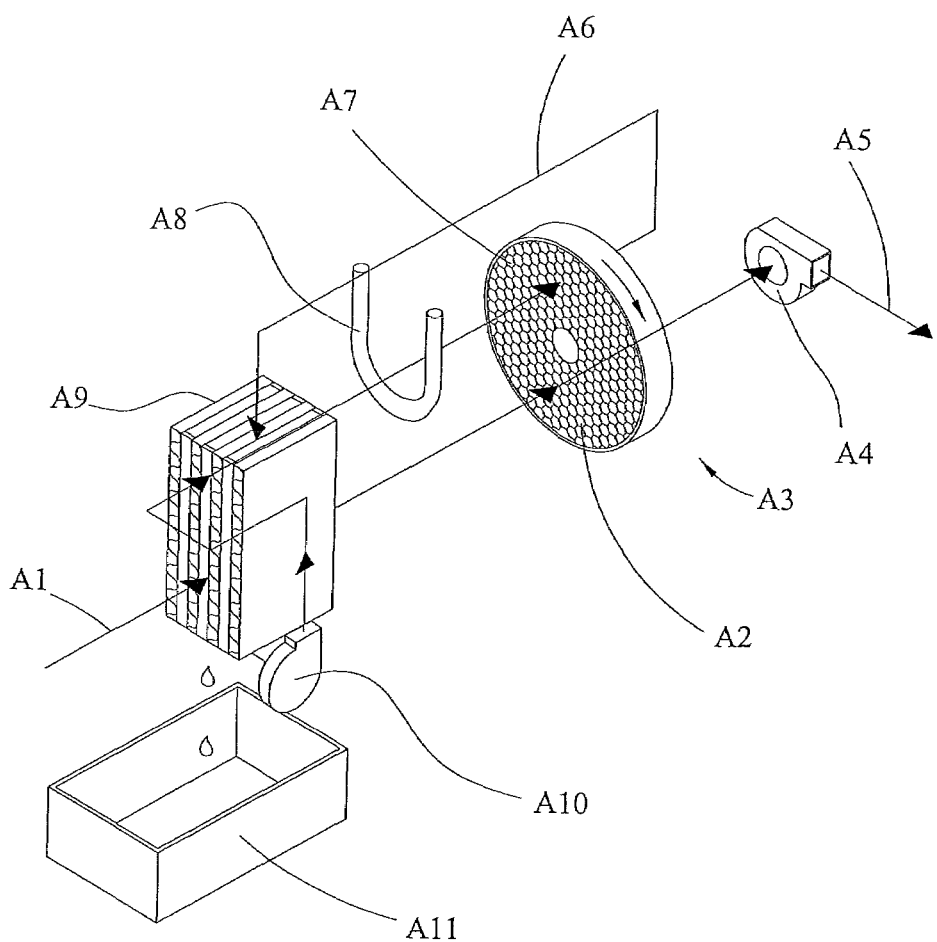
Figure 5:
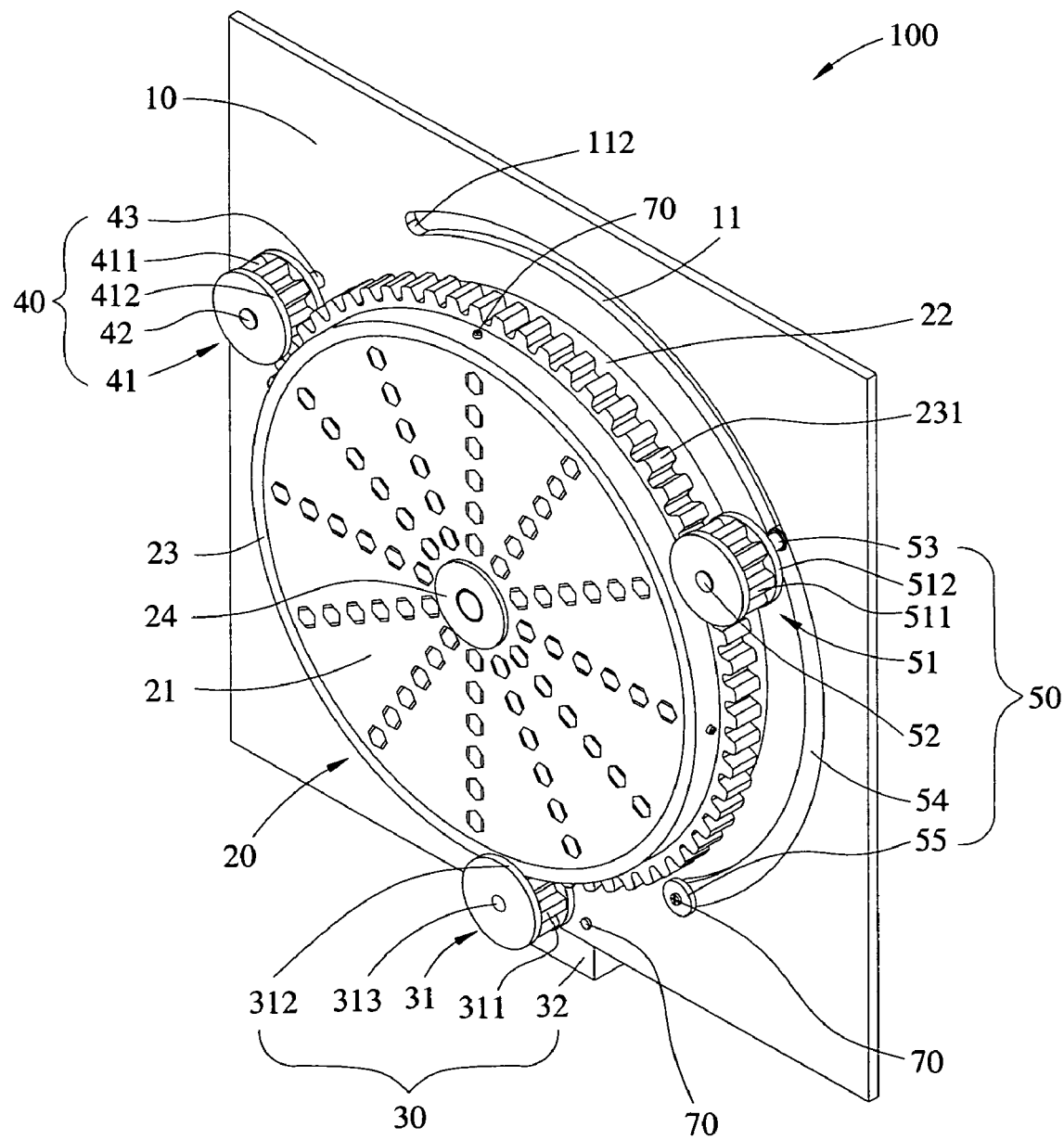
FIG. 5 is an assembled perspective view of a rotor replacing mechanism for rotary desiccant according to a first embodiment of the present invention.
Figure 6:
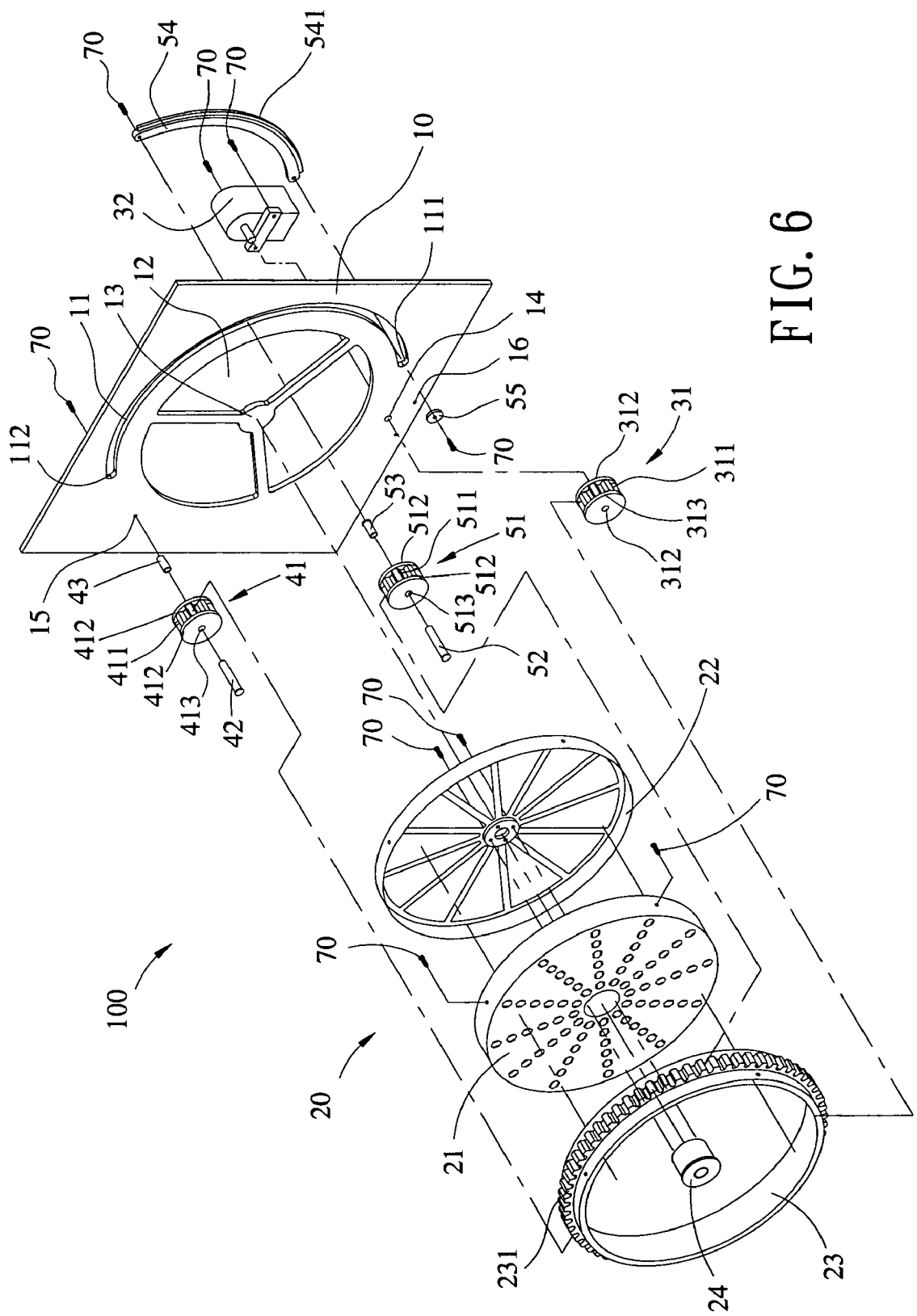
FIG. 6 is an exploded view of FIG. 5.

Please refer to FIGS. 5 and 6 that are assembled and exploded perspective views, respectively, of a rotor replacing mechanism for rotary desiccant 100 according to a first embodiment of the present invention, and to FIGS. 7 and 8 that are front and side views, respectively, of FIG. 5. For the purpose of conciseness, the present invention is also briefly referred to as "the rotor replacing mechanism" 100 herein. As shown, the rotor replacing mechanism 100 includes a base plate 10, a desiccant rotor assembly 20, a first gear assembly 30, a second gear assembly 40, and a third gear assembly 50. The base plate 10 is provided at a predetermined position with a guiding slot 11, two ends of which are separately formed into a first stop end 111 and a second stop end 112; and at a central portion with an airflow passage 12, via which dehumidified and regenerated air flows. The airflow passage 12 may be of any geometrical shape depending on actual need in design. For the airflow passage 12 to have a reinforced structural strength, a ribbed fixing plate 13 is formed in the airflow passage 12. The base plate 10 is further provided at predetermined positions with a first hole 14, a second hole 15, and a motor fixing hole 16. The first and the second gear assembly 30, 40 are fixedly mounted on the base plate 10 at the first and the second hole 14, 15, respectively. A motor 32 included in the first gear assembly 30 is fixed to the base plate 10 at the motor fixing hole 16. The third gear assembly 50 is slidably fitted in the guiding slot 11.

The desiccant rotor assembly 20 includes a rotor 21, a protective frame 22, and a protective ring 23. The protective frame 22 is fitted to a rear side of the rotor 21, and the protective ring 23 is mounted around the rotor 21 to together with the protective frame 22 protect the rotor 21. The protective ring 23 is provided along an outer surface with a plurality of teeth 231 adapted to mesh with the first, the second, and the third gear assembly 30, 40, 50. The desiccant rotor assembly 20 further includes a spindle 24, to which the rotor 21 is rotatably mounted. The spindle 24 is connected to a center of the protective frame 22 via a plurality of screws 70, and the protective ring 23 is also connected to the protective frame 22 via a plurality of screws 70, so that the rotor 21, the protective ring 23, and the protective frame 22 are tightly connected together to form a firm and stable structure.

The first gear assembly 30 is mounted on the base plate 10, and includes a first gear 31 and a motor 32. The first gear 31 has a plurality of first gear teeth 311 adapted to contact and mesh with the teeth 231 on the protective ring 23 mounted around the rotor 21. The motor 32 is fixedly mounted to the motor fixing hole 16 on the base plate 10 and is connected to the first gear 31, so as to drive the rotor 21 to rotate via the first gear 31. That is, the first gear 31 is a driving gear.

The second gear assembly 40 is mounted on the base plate 10 and includes a second gear 41. The second gear 41 has a plurality of second gear teeth 411 adapted to contact and mesh with the teeth 231 on the protective ring 23 mounted around the rotor 21, and serves as a positioning gear.

The third gear assembly 50 is mounted on the base plate 10, and includes a third gear 51 and a slider 54. The third gear 51 is mounted to a front side of the slider 54 and includes a plurality of third gear teeth 511 adapted to contact and mesh with the teeth 231 on the protective ring 23 mounted around the rotor 21. The slider 54 is located at a rear side the base plate 10 to slide between the first stop end 111 and the second stop end 112 of the guiding slot 11. Preferably, the third gear 51 is mounted to one of two ends of the slider 54 while a third fixing element 55 is mounted to the other end of the slider 54, so that the slider 54 is allowed to smoothly slide within the guiding slot 11. Using the three-point fix method, the rotor 21 is held to and between the first, the second, and the third gear 31, 41, 51 by engagement of the teeth 231 on the outer surface of the rotor 21 with the first, the second, and the third gear teeth 311, 411, 511. When the slider 54 is moved along the guiding slot 11 from the first stop end 111 to the second stop end 112, the third gear 51 is disengaged from the rotor 21, and a user of the rotary desiccant can easily remove the whole desiccant rotor assembly 20 from the base plate 10 and replaces the old rotor 21 with a new one. Reversely, when the desiccant rotor assembly 20 with the new rotor 21 has been mounted to the base plate 10 again, the slider 54 is moved along the guiding slot 11 from the second stop end 112 to the first stop end 111, so that the desiccant rotor assembly 20 is three-point fixed between the first, the second, and the third gear 31, 41, 51 again.

Please refer to FIG. 9 that shows the manner of mounting the first gear assembly 30 to the base plate 10. As shown, the first gear assembly 30 includes the first gear 31 having a plurality of first gear teeth 311, and the motor 32. The first gear 31 is provided at a front and a rear side with a first flange 312 each, so that the teeth 231 on the rotor 21 are limited to locate between the two first flanges 312, enabling the first gear 31 to stably engage with the rotor 21. As mentioned above, the first gear 31 is a driving gear being driven by the motor 32 to rotate the rotor 21. The first gear 31 includes a first shaft hole 313. The motor 32 is screwed by a screw 70 to the base plate 10 at the motor fixing hole 16 with a first shaft 321 of the motor 32 extended through the first hole 14 on the base plate 10 to engage with the first shaft hole 321 of the first gear 31. Therefore, when the motor 32 is started, it drives the first gear 31 to rotate, so that the first gear teeth 311 mesh with the teeth 231 to drive the rotor 21 to rotate at the same time to perform the dehumidifying function.

FIGS. 10 and 11 are sectioned side views showing the mounting of the second and the third gear assembly, 40 and 50, respectively, to the base plate 10. As shown in FIG. 10, the second gear 41 of the second gear assembly 40 includes a plurality of second gear teeth 411, and is provided at a front and a rear side with a second flange 412 each, so that the teeth 231 on the rotor 21 are limited to locate between the two second flanges 412, enabling the second gear 41 to stably engage with the rotor 21. The second gear assembly 40 further includes a second shaft 42 and a second shaft bush 43, and the second gear 41 has a second shaft hole 413. When the second gear assembly 40 is mounted to the base plate 10, the second shaft 42 is extended through the second shaft hole 413 on the second gear 41. For the second gear teeth 411 of the second gear 41 to properly mesh with the teeth 231 on the rotor 21, the second shaft bush 43 is put around an inner end of the second shaft 42 behind the second gear 41, so that a fixed distance defined by the second shaft bush 43 always exists between the second gear 41 and the base plate 10. A screw 70 is then screwed through the second hole 15 into the second shaft 42 to fasten the second gear assembly 40 to the base plate 10.

As can be seen from FIG. 11, the third gear assembly 50 includes a third gear 51 and a slider 54. The third gear 51 is mounted to the slider 54 and has a plurality of third gear teeth 511 adapted to mesh with the teeth 231 on the rotor 21. The third gear 51 is provided at front and rear sides with a third flange 512 each, so that the teeth 231 on the rotor 21 are limited to locate between the two third flanges 512, enabling the third gear 51 to stably engage with the rotor 21. The third gear assembly 50 further includes a third shaft 52 and a third shaft bush 53, and the third gear 51 has a third shaft hole 513. When the third gear assembly 50 is mounted to the base plate 10, the slider 54 is located in the guiding slot 11 and behind the base plate 10 with extended upper and lower edges 541 of the slider 54 abutted on a rear side of the base plate 10, allowing the slider 54 to slide along the guiding slot 11. The third shaft 52 is extended through the third shaft hole 513 on the third gear 51. For the third gear teeth 511 of the third gear 51 to properly mesh with the teeth 231 on the rotor 21, the third shaft bush 53 is put around an inner end of the third shaft 52 behind the third gear 51, so that a fixed distance defined by the third shaft bush 53 always exists between the third gear 51 and the base plate 10. A screw 70 is then screwed through an end of the slider 54 into the third shaft 52 to fasten the third gear assembly 50 to the slider 54.

Figure 13:
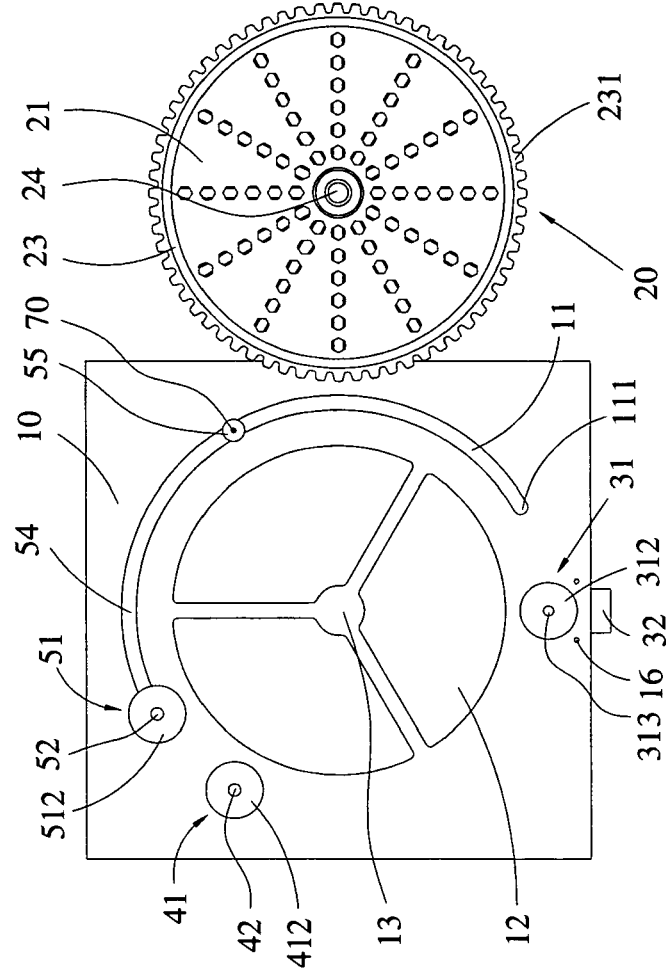
FIG. 13 shows the rotor replacing mechanism for rotary desiccant of FIG. 5 after the rotor is removed from the desiccant.
Figure 12:
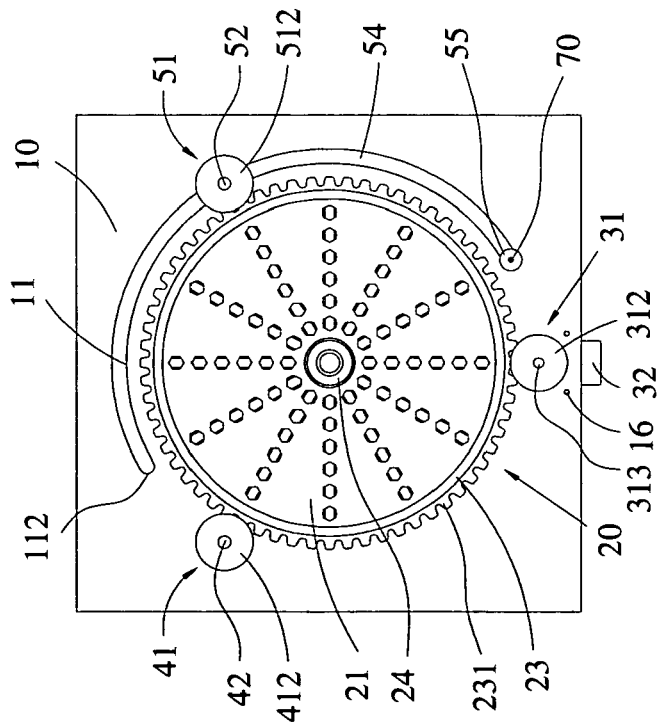
FIG. 12 shows the rotor replacing mechanism for rotary desiccant of FIG. 5 before the rotor is removed from the desiccant.

Please refer to FIGS. 12 and 13 that respectively show the state of the rotor replacing mechanism for rotary desiccant 100 according to the first embodiment of the present invention before and after the rotor 21 is removed therefrom. In FIG. 12, the desiccant rotor assembly 20 is fixed to the base plate 10 at three points by the first, second, and third gears 31, 41, and 51 of the first, second, and third gear assemblies 30, 40, and 50, respectively. At this point, the third fixing element 55 on slider 54 is located at the first stop end 111 of the guiding slot 11. The guiding slot 11 is a curved slot. When the motor 32 is actuated, the first gear 31 is rotated and drives the rotor 21 to rotate at the same time, so that the rotating rotor 21 may perform the dehumidifying and regenerating functions, as shown in FIG. 12. When it is desired to replace the rotor 21, a user needs only to move the slider 54 along the curved guiding slot 11 from the first stop end 111 to the second stop end 112. At this point, the third gear 51 is brought to a different position, at where the third gear teeth 511 are separated from and not in contact with the teeth 231, and the rotor 21 is no longer three-point fixed on the base plate 10, allowing the user to easily remove the rotor 21 from the base plate 10 as shown in FIG. 13. Then, a new rotor 21 may be mounted.

FIGS. 14 and 15 respectively show a rotor replacing mechanism for rotary desiccant 100 according to a second embodiment of the present invention before and after a rotor 21 thereof is removed from the rotary desiccant. In the second embodiment, the rotor replacing mechanism 100 is four-point fixed to the base plate 10. As shown, the rotor replacing mechanism 100 of the second embodiment includes a base plate 10, a desiccant rotor assembly 20, a first gear assembly 30, a second gear assembly 40, and a fourth gear assembly 60. The base plate 10 is provided at predetermined positions with two parallel guiding slots 11. In the second embodiment, each of the two guiding slots 11 is a linear slot and has two ends forming a first stop end 111 and a second stop end 112. The base plate 10 is further provided at a predetermined portion with an airflow passage 12, a ribbed fixing plate 13 mounted to the airflow passage 12, a first hole 14, a second hole 15, and a motor fixing hole 16. The fourth gear assembly 60 is mounted to the base plate 10, and includes two fourth gears 61 and a U-shaped slider 63, to which the two fourth gears 61 are mounted. Two ends of the U-shaped slider 63 are normally located at the first stop ends 111 on the two linear guiding slots 11. Each of the two fourth gears 61 has a plurality of fourth gear teeth 611 adapted to mesh with the teeth 231 on the rotor 21, and is provided at front and rear sides with a fourth flange 612 each, so that the teeth 231 on the rotor 21 are limited to locate between the two fourth flanges 612, enabling the fourth gears 61 to stably engage with the rotor 21. More specifically, the rotor 21 is firmly held to and between four points by the first gear 31, the second gear 41, and the two fourth gears 61. The U-shaped slider 63 is slidably connected at two ends to the guiding slots 11 to linearly move between the first stop ends 111 and the second stop ends 112 of the guiding slots 11. The first gear assembly 30 includes a motor 32 for driving the first gear 31 to rotate. When the motor 32 is actuated, the first gear 31 is rotated and drives the rotor 21 to rotate at the same time, so that the rotating rotor 21 may perform the dehumidifying and regenerating functions, as shown in FIG. 14. When it is desired to replace the rotor 21, a user needs only to move the U-shaped slider 63 along the two linear guiding slots 11 from the first stop end 111 to the second stop end 112. At this point, the two fourth gears 61 on the U-shaped slider 63 are brought to a different position, at where the fourth gear teeth 611 are separated from and not in contact with the teeth 231, and the rotor 21 is no longer four-point fixed on the base plate 10, allowing the user to easily remove the rotor 21 from the base plate 10 as shown in FIG. 15. Then, a new rotor 21 may be mounted.

Figure 16:
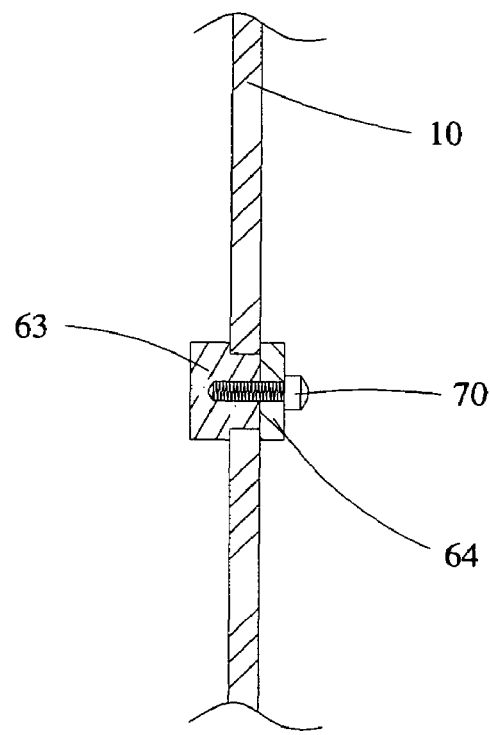
FIG. 16 is a sectioned side view showing the mounting of a U-shaped slider in a guiding slot on the base plate of the rotor replacing mechanism for rotary desiccant of FIG. 14.

FIG. 16 is a sectioned side view showing the mounting of the U-shaped slider 63 to the linear guiding slots 11 on the base plate 11 in the second embodiment of the rotor replacing mechanism 100. To mount the U-shaped slider 63 to the linear guiding slots 11, a fourth fixing element 64 is connected to and behind each end of the U-shaped slider 63 by forward threading a screw 70 through the fixing element 64 into the U-shaped slider 63, so that the slider 63 and the fixing elements 64 are separately slidably located before and behind the guiding slots 11 on the base plate 10.

Figure 17:
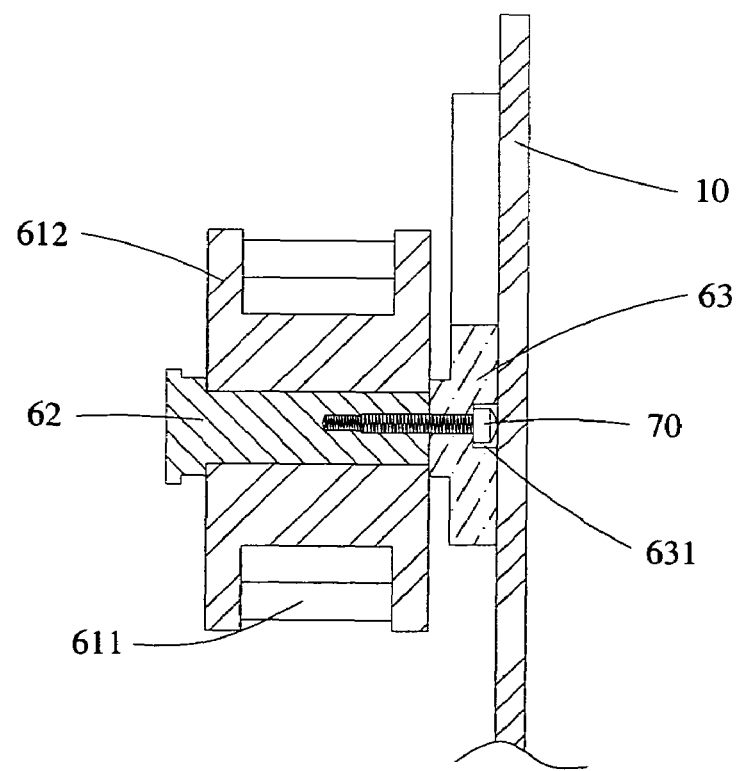
FIG. 17 is a sectioned side view showing the mounting of a fourth gear assembly to the U-shaped slider in the rotor replacing mechanism of FIG. 14.

FIG. 17 is a sectioned side view showing the mounting of the fourth gear assembly 60 to the U-shaped slider 63. As shown, the fourth gear assembly 60 includes two fourth gears 61 mounted on a front side of the U-shaped slider 63 at predetermined positions. Each of the fourth gears 61 has a plurality of fourth gear teeth 611, and is provided at front and rear sides with a fourth flange 612 each, so that the teeth 231 on the rotor 21 are limited to locate between the two fourth flanges 612, enabling the fourth gears 61 to stably engage with the rotor 21. The fourth gear assembly 60 further includes two fourth shafts 62, and each of the fourth gears 61 has a fourth shaft hole 613. To mount each fourth gear 61 to the U-shaped slider 63, the fourth shaft 62 is extended through the fourth shaft hole 613, and a screw 70 is forward screwed through a recess 631 at a rear side of the U-shaped slider 63 into an inner end of the fourth shaft 62 to connect the fourth gear 61 to the slider 63. With the rear recesses 631, the screws 70 would not interfere or collide with the base plate 10 when the U-shaped slide 63 is slid along the guiding slots 11.

With the above described rotor replacing mechanism for rotary desiccant, a rotor in the rotary desiccant is held to and between three or four points on a base plate by three or four gear assemblies. The first gear assembly drives the rotor to rotate and perform the dehumidifying and regenerating functions, the second gear assembly is fixedly mounted on the base plate to engage with the rotor, and the third or the fourth gear assembly is mounted on a slider and may be moved to disengage from the rotor by moving the slider along a guiding slot on the base plate. When the third or the fourth gear assembly is disengaged from the rotor, the rotor may be removed from the base plate and replaced with a new one.

What is claimed is:

1. A rotor replacing mechanism for rotary desiccant, comprising:
   a base plate being provided at a predetermined position with a guiding slot, two ends of said guiding slot being formed of a first and a second stop end;
   a desiccant rotor assembly including a rotor for performing dehumidifying and regenerating functions, said rotor being provided on an outer circumferential surface with a plurality of teeth;
   a first gear assembly being mounted to said base plate at a predetermined position, and including a first gear adapted to mesh with said teeth on said rotor, and a motor for driving said first gear to rotate;
   a second gear assembly being mounted to said base plate and including a second gear adapted to mesh with said teeth on said rotor; and
   a third gear assembly being mounted to said base plate, and including a third gear adapted to mesh with said teeth on said rotor, and a slider, on which said third gear is mounted; said slider being located behind said base plate to slide along said guiding slot, so that said third gear may be moved along with said slider to a different position; and
   said first, said second, and said third gear being normally arranged at three points in contact with the outer circumferential surface of said rotor and thereby holding said rotor in place.

2. A rotor replacing mechanism for rotary desiccant, comprising:
   a base plate being provided at predetermined positions with two parallel guiding slots, two ends of each of said guiding slots being formed of a first and a second stop end;
   a desiccant rotor assembly including a rotor for performing dehumidifying and regenerating functions, said rotor being provided on an outer circumferential surface with a plurality of teeth;
   a first gear assembly being mounted to said base plate at a predetermined position, and including a first gear adapted to mesh with said teeth on said rotor, and a motor for driving said first gear to rotate;
   a second gear assembly being mounted to said base plate and including a second gear adapted to mesh with said teeth on said rotor; and
   a fourth assembly being mounted to said base plate, and including two fourth gears and a U-shaped slider; said fourth gears being connected to a front side of said U-shaped slider and adapted to mesh with said teeth on said rotor, and said U-shaped slider being slidably connected to said two guiding slots on said base plate, so that said fourth gears may be moved along with said U-shaped slider to different positions; and
   said first gear, said second gear, and said fourth gears being normally arranged at four points in contact with the outer circumferential surface of said rotor and thereby holding said rotor in place.

3. The rotor replacing mechanism for rotary desiccant as claimed in claim 1, wherein said base plate is provided at a predetermined position with an airflow passage and a ribbed fixing plate; said airflow passage allowing dehumidified and regenerating air to flow therethrough, and said ribbed fixing plate being mounted in said airflow passage to give said airflow passage a reinforced structural strength.

4. The rotor replacing mechanism for rotary desiccant as claimed in claim 1, wherein said base plate further includes a first hole, a second hole, and a motor fixing hole; said motor of said first gear assembly being mounted to said base plate at said motor fixing hole, and said first gear and said second gear assembly being fixedly mounted to said base plate at said first and said second hole, respectively.

5. The rotor replacing mechanism for rotary desiccant as claimed in claim 1, wherein said desiccant rotor assembly further includes a protective frame attached to a rear side of said rotor, and a protective ring mounted around said rotor, and said a plurality of teeth being provided on said protective ring.

6. The rotor replacing mechanism for rotary desiccant as claimed in claim 5, wherein said desiccant rotor assembly further includes a spindle mounted to a center of said protective frame by screws, and said protective ring being connected to said protective frame by screws.

7. The rotor replacing mechanism for rotary desiccant as claimed in claim 1, wherein said first gear is provided at front and rear sides with a first flange each, such that said teeth on said rotor are limited to locate between said two first flanges, enabling said first gear to stably engage with said rotor.

8. The rotor replacing mechanism for rotary desiccant as claimed in claim 1, wherein said first gear further includes a first shaft hole for engaging with a shaft of said motor.

9. The rotor replacing mechanism for rotary desiccant as claimed in claim 1, wherein said second gear is provided at front and rear sides with a second flange each, such that said teeth on said rotor are limited to locate between said two second flanges, enabling said second gear to stably engage with said rotor.

10. The rotor replacing mechanism for rotary desiccant as claimed in claim 1, wherein said second gear assembly further includes a second shaft and a second shaft bush, and said second gear is provided with a second shaft hole; said shaft bush defining a fixed distance between said second gear and said base plate, and said second shaft being extended through said second shaft hole of said second gear to engage with said second shaft bush, and then connected to said base plate with a screw.

11. The rotor replacing mechanism for rotary desiccant as claimed in claim 1, wherein said third gear is provided at front and rear sides with a third flange each, such that said teeth on said rotor are limited to locate between said two third flanges, enabling said third gear to stably engage with said rotor.

12. The rotor replacing mechanism for rotary desiccant as claimed in claim 1, wherein said third gear assembly further includes a third shaft and a third shaft bush, and said third gear is provided with a third shaft hole; said third shaft bush defining a fixed distance between said third gear and said base plate, and said third shaft being extended through said third shaft hole of said third gear to engage with said third shaft bush, and then connected to a first end of said slider with a screw.

13. The rotor replacing mechanism for rotary desiccant as claimed in claim 1, wherein said third gear assembly further includes a third fixing element, which is mounted to a second end of said slider, so that said slider is allowed to smoothly slide along said guiding slot.

14. The rotor replacing mechanism for rotary desiccant as claimed in claim 1, wherein said guiding slot is a curved guiding slot.

15. The rotor replacing mechanism for rotary desiccant as claimed in claim 2, wherein each of said fourth gears is provided at front and rear sides with a fourth flange each, such that said teeth on said rotor are limited to locate between said two fourth flanges, enabling said fourth gear to stably engage with said rotor.

16. The rotor replacing mechanism for rotary desiccant as claimed in claim 2, wherein said fourth gear assembly further includes two fourth shafts, and each of said fourth gears is provided with a fourth shaft hole; said fourth shafts being separately extended through said fourth shaft holes on said fourth gears and then connected to said U-shaped slider with a screw each.

17. The rotor replacing mechanism for rotary desiccant as claimed in claim 2, wherein said two guiding slots are linear guiding slots.

18. The rotor replacing mechanism for rotary desiccant as claimed in claim 2, wherein said U-shaped slider is provided on a rear side at predetermined positions with a recess each, and a screw being forward extended through said slider at each of said recesses to connect said fourth gear to said U-shaped slider.

19. The rotor replacing mechanism for rotary desiccant as claimed in claim 2, wherein said fourth gear assembly further includes a fourth fixing element connected to and behind each of two ends of said U-shaped slider by forward threading a screw through said fourth fixing element into said U-shaped slider.

20. The rotor replacing mechanism for rotary desiccant as claimed in claim 2, wherein said base plate is provided at a predetermined position with an airflow passage and a ribbed fixing plate; said airflow passage allowing dehumidified and regenerating air to flow therethrough, and said ribbed fixing plate being mounted in said airflow passage to give said airflow passage a reinforced structural strength.

21. The rotor replacing mechanism for rotary desiccant as claimed in claim 2, wherein said base plate further includes a first hole, a second hole, and a motor fixing hole; said motor of said first gear assembly being mounted to said base plate at said motor fixing hole, and said first gear and said second gear assembly being fixedly mounted to said base plate at said first and said second hole, respectively.

22. The rotor replacing mechanism for rotary desiccant as claimed in claim 2, wherein said desiccant rotor assembly further includes a protective frame attached to a rear side of said rotor, and a protective ring mounted around said rotor, and said a plurality of teeth being provided on said protective ring.

23. The rotor replacing mechanism for rotary desiccant as claimed in claim 22, wherein said desiccant rotor assembly further includes a spindle mounted to a center of said protective frame by screws, and said protective ring being connected to said protective frame by screws.

24. The rotor replacing mechanism for rotary desiccant as claimed in claim 2, wherein said first gear is provided at front and rear sides with a first flange each, such that said teeth on said rotor are limited to locate between said two first flanges, enabling said first gear to stably engage with said rotor.

25. The rotor replacing mechanism for rotary desiccant as claimed in claim 2, wherein said first gear further includes a first shaft hole for engaging with a shaft of said motor.

26. The rotor replacing mechanism for rotary desiccant as claimed in claim 2, wherein said second gear is provided at front and rear sides with a second flange each, such that said teeth on said rotor are limited to locate between said two second flanges, enabling said second gear to stably engage with said rotor.

27. The rotor replacing mechanism for rotary desiccant as claimed in claim 2, wherein said second gear assembly further includes a second shaft and a second shaft bush, and said second gear is provided with a second shaft hole; said shaft bush defining a fixed distance between said second gear and said base plate, and said second shaft being extended through said second shaft hole of said second gear to engage with said second shaft bush, and then connected to said base plate with a screw.

* * * * *